United States Patent
Nakamura

(10) Patent No.: US 9,824,644 B2
(45) Date of Patent: Nov. 21, 2017

(54) DISPLAY ELEMENT HAVING SWITCHING ELEMENTS FORMED INTO DIFFERENT SHAPES CORRESPONDING TO SUB PIXELS OF DIFFERENT SIZES

(71) Applicant: Japan Display Inc., Minato-ku (JP)

(72) Inventor: Masato Nakamura, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 132 days.

(21) Appl. No.: 14/540,462

(22) Filed: Nov. 13, 2014

(65) Prior Publication Data

US 2015/0138054 A1  May 21, 2015

(30) Foreign Application Priority Data

Nov. 20, 2013 (JP) .................. 2013-239573

(51) Int. Cl.
*G09G 3/36* (2006.01)
*G09G 3/20* (2006.01)
(Continued)

(52) U.S. Cl.
CPC ......... *G09G 3/3607* (2013.01); *G02F 1/1362* (2013.01); *G02F 1/13439* (2013.01);
(Continued)

(58) Field of Classification Search
CPC ......... G09G 3/3607; G09G 2300/0443; G09G 2300/0452; G02F 2201/52
(Continued)

(56) References Cited

U.S. PATENT DOCUMENTS 7,180,560 B2   2/2007 Chuang et al.
7,190,122 B2   3/2007 Winters et al.
(Continued)

FOREIGN PATENT DOCUMENTS

CN   103108140 A   5/2013
CN   103116238 A   5/2013
(Continued)

OTHER PUBLICATIONS

Combined Office Action and Search Report issued Jan. 23, 2017 in Chinese Patent Application No. 201410599248.4 (with English-language Translation).
(Continued)

*Primary Examiner* — Chanh Nguyen
*Assistant Examiner* — Daniel Duong
(74) *Attorney, Agent, or Firm* — Oblon, McClelland, Maier & Neustadt, L.L.P.

(57) ABSTRACT

According to one embodiment, a display element includes a plurality of scanning lines and a plurality of signal lines orthogonal to the plurality of scanning lines. A pixel of the display element includes sub-pixels of a plurality of colors to be respectively formed in the regions surrounded by the scanning lines and the signal lines. The size of a sub-pixel of a predetermined color among the plurality of colors is larger than the sizes of the sub-pixels of the other colors. Switching elements of the display element are connected to the scanning lines and the signal lines and drive the sub-pixels, respectively, and are formed into different shapes corresponding to the sub-pixels with different sizes.

7 Claims, 2 Drawing Sheets

(51) Int. Cl.
  *G02F 1/1343* (2006.01)
  *G02F 1/1362* (2006.01)
  *G02F 1/1335* (2006.01)

(52) U.S. Cl.
  CPC ......... *G02F 1/134309* (2013.01); *G09G 3/20* (2013.01); *G02F 1/133514* (2013.01); *G02F 2201/52* (2013.01); *G09G 3/3648* (2013.01); *G09G 2300/0443* (2013.01); *G09G 2300/0452* (2013.01)

(58) Field of Classification Search
  USPC .......................................................... 345/88
  See application file for complete search history.

(56) References Cited

U.S. PATENT DOCUMENTS

| | | | | |
|---|---|---|---|---|
| 2010/0327411 A1* | 12/2010 | Nozu | ................... | H01L 29/861 257/546 |
| 2011/0181634 A1 | 7/2011 | Higashi et al. | | |
| 2012/0295508 A1 | 11/2012 | Sung et al. | | |
| 2013/0135845 A1* | 5/2013 | Matsui | ................... | G09F 13/04 362/97.1 |
| 2013/0229326 A1* | 9/2013 | Kamada | ............... | G09G 3/3648 345/32 |
| 2014/0043217 A1* | 2/2014 | Kim | ..................... | G09G 3/3208 345/76 |
| 2014/0217411 A1* | 8/2014 | Jiang | ..................... | H01L 27/124 257/59 |
| 2014/0292622 A1* | 10/2014 | Lee | ...................... | G09G 3/3233 345/80 |
| 2016/0116813 A1* | 4/2016 | Mochizuki | ........ | G02F 1/136286 349/138 |
| 2016/0170276 A1* | 6/2016 | Okita | ................. | G02F 1/136286 349/43 |

FOREIGN PATENT DOCUMENTS

| | | |
|---|---|---|
| CN | 103137023 A | 6/2013 |
| JP | 2008-40496 A | 2/2008 |
| JP | 2008-532245 A | 8/2008 |
| JP | 2011-154321 | 8/2011 |
| JP | 2012-190029 A | 10/2012 |
| JP | 2013-57921 A | 3/2013 |
| JP | 2013-113880 | 6/2013 |
| WO | WO 2012/144517 A1 | 10/2012 |

OTHER PUBLICATIONS

Office Action dated May 31, 2017 in Japanese Patent Application No. 2013-239573 (with English translation).
Office Action issued in Japanese Patent Application No. 2013-239573 dated Jul. 26, 2017 with English Translation.
Office Action issued in Chinese Application No. 201410599248.4 dated Aug. 8, 2017 with English Translation.

* cited by examiner

DISPLAY ELEMENT HAVING SWITCHING ELEMENTS FORMED INTO DIFFERENT SHAPES CORRESPONDING TO SUB PIXELS OF DIFFERENT SIZES

INCORPORATION BY REFERENCE

The present invention claims priority under 35 U.S.C. §119 to Japanese Patent Application No. 2013-239573 filed on Nov. 20, 2013. The content of the application is incorporated herein by reference in its entirety.

FIELD

An embodiment of the present invention relates to a display element that drives sub-pixels of a plurality of colors of pixels by a plurality of switching elements, respectively.

BACKGROUND

Conventionally, for a display element, a technique with which one pixel is constituted by adding a white sub-pixel to sub-pixels of three primary colors of red, green, and blue, is used. Thus, by adding a white sub-pixel to the sub-pixels of three primary colors, an improvement in luminance and a reduction in power consumption can be realized.

In addition, one pixel is constituted by adding a white sub-pixel to sub-pixels of two colors of the three primary colors in addition to the sub-pixels of the three primary colors, and further, the white sub-pixel and a sub-pixel of one color the number of which is one smaller than the two are made larger than the other sub-pixels, and accordingly, a reduction in the aperture ratio of each sub-pixel region due to addition of the white sub-pixel is suppressed, and shifting of the chromaticity to the complementary color side when displaying white is reduced. In this case, merely making different the sizes of the sub-pixels may not bring about a sufficient effect of making different the sizes of the sub-pixels.

DETAILED DESCRIPTION

A display element according to an embodiment includes a plurality of scanning lines disposed along a predetermined direction, and a plurality of signal lines disposed along a direction orthogonal to the scanning lines. The pixel of the display element includes sub-pixels of a plurality of colors to be respectively formed in the regions surrounded by the scanning lines and the signal lines, and the size of a sub-pixel of a predetermined color among the plurality of colors is larger than the sizes of the sub-pixels of the other colors. The switching elements of the display element are connected to the scanning lines and the signal lines and respectively drive the sub-pixels, and are formed into different shapes corresponding to the sub-pixels with different sizes.

Figure 1:
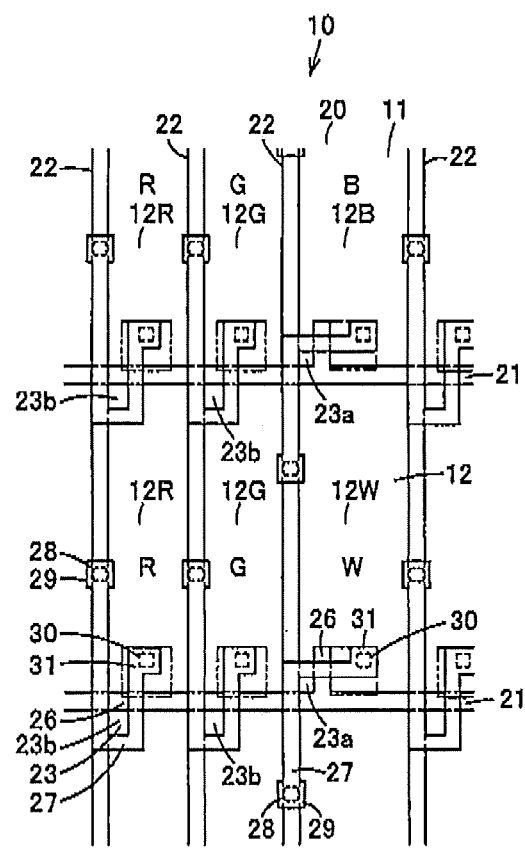
FIG. 1 is a front view of a display element showing a first embodiment.

Hereinafter, a first embodiment is described with reference to FIG. 1 and FIG. 2.

Figure 2:
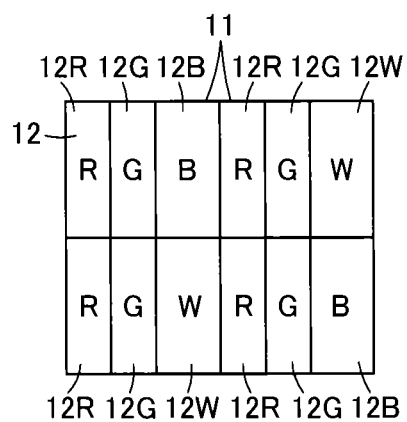
FIG. 2 is a front view showing pixels of the display element.

As shown in FIG. 2, in the display element 10, a plurality of pixels 11 are respectively disposed in a matrix along the vertical direction (column direction) as the first direction and the horizontal direction (row direction) as the second direction orthogonal to the vertical direction (only two pixels 11 are shown in FIG. 2, however, the plurality of pixels 11 are disposed in a matrix along the vertical direction and the horizontal direction).

Each pixel 11 includes sub-pixels 12 of a plurality of colors, respectively. In the present embodiment, each pixel 11 includes red sub-pixels (R) 12R, green sub-pixels (G) 12G, a blue sub-pixel (B) 12B, and a white sub-pixel (W) 12W, respectively, and each one pixel 11 consists of two each of the red sub-pixels 12R and the green sub-pixels 12G and one each of the blue sub-pixel 12B and the white sub-pixel 12W, respectively. That is, each pixel 11 includes six sub-pixels 12.

Three sub-pixels of a red sub-pixel 12R, a green sub-pixel 12G, and a blue sub-pixel 12B are juxtaposed to each other as a first group in the horizontal direction, three sub-pixels of a red sub-pixel 12R, a green sub-pixel 12G, and a white sub-pixel 12W are juxtaposed to each other as a second group in the horizontal direction, and these two groups are juxtaposed to each other in the vertical direction. Therefore, each pixel 11 includes three sub-pixels 12 in each row in the horizontal direction and two sub-pixels 12 in each column in the vertical direction.

In the pixels 11 adjacent to each other in the horizontal direction, the positions in the vertical direction of the sub-pixels 12 are inverted alternately. That is, in the pixel 11 on the left side in FIG. 2, the first group is positioned on the upper side, the second group is positioned on the lower side, and on the other hand, in the pixel 11 on the right side in FIG. 2, the second group is positioned on the upper side, and the first group is positioned on the lower side. As the entirety of the pixels 11, two pixels 11 adjacent to each other in the horizontal direction are set as one unit and are repeatedly disposed in the horizontal direction and the vertical direction, respectively.

Among the sub-pixels 12 of the plurality of colors in each pixel 11, the size (area) of the sub-pixel 12 of a predetermined color is larger than the sizes (areas) of the sub-pixels 12 of the other colors. In the present embodiment, the sub-pixel 12 of the predetermined color is the blue sub-pixel 12B and the white sub-pixel 12W, the sub-pixels 12 of the other colors are the red sub-pixel 12R and the green sub-pixel 12G, and the sizes (areas) of the blue sub-pixels 12B and the white sub-pixels 12W juxtaposed in the vertical direction are larger than the sizes (areas) of the red sub-pixels 12R and the green sub-pixels 12G. The sizes are made different by making the widths in the horizontal direction of the blue sub-pixels 12B and the white sub-pixels 12W wider than the widths in the horizontal direction of the red sub-pixels 12R and the green sub-pixels 12G.

The display element 10 is, for example, an active matrix type liquid crystal panel capable of performing color display. As shown in FIG. 1, this liquid crystal panel is constituted by disposing an array substrate 20 and a counter substrate so as to oppose each other, and between these substrates, interposing a liquid crystal layer as a light modulation layer and a spacer not illustrated that holds the distance between the substrates constantly, and bonding peripheral edge portions of these by an adhesive layer not illustrated. In the display region at a center portion of the liquid crystal panel, a plurality of pixels 11 are disposed in a matrix along the vertical direction and the horizontal direction, respectively.

The array substrate 20 includes, for example, a glass substrate that is an insulating substrate with translucency. On a principal surface on the liquid crystal layer side of this glass substrate, a plurality of scanning lines (gate wires) 21 are disposed along the horizontal direction so as to be spaced from each other, and a plurality of signal lines (source wires) 22 are disposed along the vertical direction so as to be spaced from each other, and these scanning lines 21 and signal lines 22 are in a lattice form while being electrically insulated from each other. At positions surrounded by these scanning lines 21 and signal lines 22, pixel electrodes respectively constituting the sub-pixels 12 are disposed. The pixel electrodes are made of a transparent conductive material, for example, ITO, etc. The plurality of signal lines 22 are disposed so that the interval between the signal lines 22 corresponding to the region of the row of the blue sub-pixel 12B and the white sub-pixel 12W the sizes of which are large becomes larger than the interval between the signal lines 22 corresponding to the region of each row of the red sub-pixel 12R and the green sub-pixel 12G the sizes of which are small.

At each of the intersections of these scanning lines 21 and the signal lines 22, a thin film transistor (TFT) 23 as a switching element for driving each sub-pixel 12 is provided.

In the thin film transistor 23, a semiconductor layer 27 that constitutes a channel region of the thin film transistor 23 is formed on an insulating film formed on a glass substrate. Further, on this semiconductor layer 27, an insulating film is formed, and on this insulating film, the scanning line 21 and a gate electrode 26 electrically connected to the scanning line 21 are formed. The semiconductor layer 27 is made of polycrystalline silicon such as polysilicon, etc., and on one end side of the semiconductor layer 27, a source electrode 29 electrically connected to the signal line 22 through a through hole 28 is formed, and on the other end side of the semiconductor layer 27, a drain electrode 31 electrically connected to the pixel electrode constituting the sub-pixel 12 through a through hole 30 is formed.

The thin film transistors 23 are formed to have different shapes according to the sub-pixels 12 the sizes of which are different. That is, as thin film transistors 23 corresponding to the blue sub-pixels 12B and the white sub-pixels 12W the sizes of which are large, L-shaped thin film transistors 23a are used, and as thin film transistors 23 corresponding to the red sub-pixels 12R and the green sub-pixels 12G the sizes of which are small, U-shaped thin film transistors 23b are used.

The L-shaped thin film transistor 23a has a gate electrode 26 formed to project to the inside of the sub-pixel region from the scanning line 21, and a semiconductor layer 27 having an L shape, and is disposed so that one end side along the vertical direction of the semiconductor layer 27 is disposed on the signal line 22 , and the other end side along the horizontal direction of the semiconductor layer 27 passes through the surface of the gate electrode 26.

The U-shaped thin film transistor 23b has a gate electrode 26 formed on the scanning line 21, and a semiconductor layer 27 having a U shape, and is disposed so that one end side along the vertical direction of the semiconductor layer 27 is disposed on the signal line 22, the intermediate portion (bent portion) along the horizontal direction of the semiconductor layer 27 projects to an adjacent sub-pixel region, and the other end side along the vertical direction of the semiconductor layer 27 passes through the surface of the gate electrode 26 from the adjacent sub-pixel region.

The use of the L-shaped thin film transistor 23a can make larger the aperture ratio (aperture area) of the sub-pixel region than in the case of using the U-shaped thin film transistor, 23b, however, it has manufacturing limitations when the definition is made higher, and on the other hand, when the U-shaped thin film transistor 23b is used, the aperture ratio (aperture area) of the sub-pixel region becomes smaller than in the case of using the L-shaped thin film transistor 23a, however, the U-shaped thin film transistor 23b can easily be adapted to higher definition.

On the other hand, in the counter substrate, a color filter layer being a coloring layer, counter electrodes, and an alignment film for aligning liquid crystal molecules of the liquid crystal layer, etc., are laminated in order on a glass substrate. The color filter layer includes filter portions respectively corresponding to red, green, blue, and white, and a light shielding portion that segments the filter portions and shields against unnecessary light, and the filter portions are respectively formed at the portions corresponding to the pixel electrodes and constitute the respective sub-pixels 12. As the filter portion corresponding to white, a transparent filter portion may be formed, or no filter portion may be provided. The counter electrodes are made of a transparent conductive material, for example, ITO, etc., at positions corresponding to the pixel electrodes.

These color filter layer and counter electrodes may be disposed on the array substrate 20 side depending on the mode of the liquid crystal panel.

By outputting a signal to the scanning line 21 from a drive circuit that drives the liquid crystal panel, the signal is input into the gate electrode 26 of the thin film transistor 23 electrically connected to the scanning line 21, and by outputting a signal from the drive circuit to the signal line 22, the signal is input into the source electrode 29 of the thin film transistor 23 electrically connected to the signal line 22, and this thin film transistor 23 is controlled to perform switching, a pixel signal is written on the pixel electrode from the drain electrode 31 of the thin film transistor 23, and the respective sub-pixels 12 of the pixel 11 are driven independently.

In the display element 10 thus constituted, one pixel 11 consists of, in addition to the sub-pixels 12R, 12G, and 12B of three primary colors, sub-pixels 12R and 12G of two colors of the three primary colors and a white sub-pixel 12W, and further, the white sub-pixel 12W and the sub-pixel 12B of one color the number of which is one smaller than the two are made larger than the other sub-pixels 12R and 12G, and accordingly, the luminance can be improved and the power consumption can be reduced, a reduction in the aperture ratio due to the addition of the white sub-pixel 12W can be suppressed, and shifting of the chromaticity to the complementary color side when displaying white can be reduced. Further, the smaller the red sub-pixel 12R and the green sub-pixel 12G, the easier the color matching.

In addition, the thin film transistors 23 are formed into different shapes corresponding to the sub-pixels 12 with different sizes, so that the effect of the different sizes of the sub-pixels 12 can further be improved.

That is, as thin film transistors 23 corresponding to the blue sub-pixels 12B and the white sub-pixels 12W the sizes of which are large, L-shaped thin film transistors 23a are used, and as thin film transistors 23 corresponding to the red sub-pixels 12R and the green sub-pixels 12G the sizes of which are small, U-shaped thin film transistors 23b are used. The L-shaped thin film transistor 23a has a gate electrode formed to project from the scanning line 21, and a semiconductor layer 27 formed to pass through the surface of the gate electrode 26 along a direction parallel to the scanning line 21, and the U-shaped thin film transistor 23b has a gate electrode 26 disposed on the scanning line 21, and a semiconductor layer 27 formed to pass through the surface of the gate electrode 26 along a direction parallel to the signal line 22.

Accordingly, the L-shaped thin film transistor 23a has manufacturing limitations when the definition is made higher, so that it is more suitable for the blue sub-pixel 12B and the white sub-pixel 12W the sizes of which are larger than for the red sub-pixels 12R and the green sub-pixels 12R the sizes of which are small. The number of blue sub-pixels 12B is smaller than the numbers of other red sub-pixels 12R and green sub-pixels 12G, so that for regulating chromaticity balance, the sizes of the blue sub-pixels 12B need to be larger than the sizes of sub-pixels of the other colors. For an improvement in luminance, instead of the blue sub-pixels 12B, the white sub-pixels 12W are disposed, so that the width of the white sub-pixel 12W is equal to the width of the blue sub-pixel 12B.

Although the use of the U-shaped thin film transistor 23b makes small the aperture ratio of the sub-pixel region, the U-shaped thin film transistor 23b can easily be adapted to higher definition, so that the U-shaped thin film transistor 23b is suitable for the red sub-pixels 12R and the green sub-pixels 12G the sizes of which are small. Therefore, by forming the thin film transistors 23 into different shapes corresponding to the sub-pixels 12 with different sizes, the effect of the different sizes of the sub-pixels 12 can further be improved.

Figure 3:
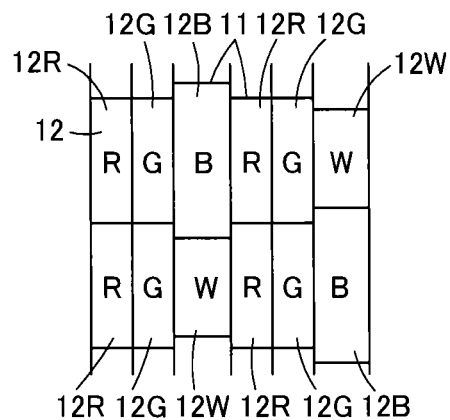
FIG. 3 is a front view showing pixels of a display element according to a second embodiment.

Next, a second embodiment is shown in FIG. 3. The same components and operations as those in the first embodiment are designated by the same reference symbols, and description thereof is omitted.

The length in the vertical direction of the blue sub-pixel 12B is made longer than the length in the vertical direction of the white sub-pixel 12W. The short side and the long side of the blue sub-pixel 12B are made longer than the short sides and the long sides of the red sub-pixel 12R and the green sub-pixel 12G. Further, the short side of the white sub-pixel 12W has a length equivalent to the length of the short side of the blue sub-pixel 12B, and the long side of the white sub-pixel 12W is shorter than the long sides of sub-pixels of the other colors (red, green, and blue). Therefore, as the areas of these sub-pixels, the blue sub-pixel 12B is larger than the red sub-pixel 12R and the green sub-pixel 12G, and the blue sub-pixel 12B, the red sub-pixel 12R, and the green sub-pixel 12G are larger than the white sub-pixel 12W.

In the present embodiment in which the red sub-pixel 12R, the green sub-pixel 12G, and the blue sub-pixel 12B constitute one picture element, and the red sub-pixel 12R, the green sub-pixel 12G, and the white sub-pixel 12W that are other than the sub-pixels constituting the aforementioned picture element constitute the other one picture element, the other one picture element consisting of the red sub-pixel 12R, the green sub-pixel 12G, and the white sub-pixel 12W is disposed on each of the upper, lower, left, and right sides of the one picture element consisting of the red sub-pixel 12R, the green sub-pixel 12G, and the blue sub-pixel 12B.

By regulating the relationship of the areas of the respective sub-pixels 12R, 12G, 12B, and 12W and the disposition relationship of picture elements as described above, the chromaticity balance and luminance balance can be regulated and the display quality can be improved.

With these regulations of the relationship of the areas of the respective sub-pixels 12R, 12G, 12B, and 12W and the disposition relationship of picture elements, when the definition of the pixels is made higher, the widths in the horizontal direction of the red sub-pixel 12R and the green sub-pixel 12G become smaller when compared to the width of the blue sub-pixel 12B, so that by applying the U-shaped thin film transistor 23b, adaptation to the higher definition is possible. On the other hand, the pixel of the blue sub-pixel 12B is formed to be large for maintaining the chromaticity balance and the luminance balance with the other colors, so that by applying the L-shaped thin film transistor 23a, a reduction in the aperture ratio can be suppressed and desired chromaticity and luminance can be obtained. The white sub-pixel 12W has a width equal to the width in the horizontal direction of the blue sub-pixel 12B, so that by applying the L-shaped thin film transistor 23a, desired luminance can be obtained.

The display element 10 (array substrate 20) is applicable not only to liquid crystal panels but also to display elements such as organic EL display elements and other spontaneous light emitting display elements, etc.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display element comprising:
   a plurality of scanning lines disposed along a predetermined direction;
   a plurality of signal lines disposed along a direction orthogonal to the scanning lines;
   a pixel that includes a first sub-pixel and a second sub-pixel formed in the regions surrounded by the scanning lines and the signal lines; and
   a plurality of switching elements that include a first switching element and a second switching element connected to the scanning lines and the signal lines and drive the first sub-pixel and the second sub-pixel, wherein
   the size of the second sub-pixel is larger than the size of the first sub-pixel,
   the first switching element is formed in the first sub-pixel and the second switching element is formed in the second sub-pixel,
   each of the switching elements has a semiconductor layer, a gate electrode that crosses the semiconductor layer and that is connected to a scanning line, and a source electrode connected to a signal line on one end side of the semiconductor layer and a drain electrode connected to the other end side of the semiconductor layer,
   in the first switching element, the gate electrode is formed to project from the scanning line, and the semiconductor layer crossing the gate electrode is formed to pass through the gate electrode along a direction parallel to the scanning line,
   in the second switching element, the gate electrode is disposed on the scanning line, and the semiconductor layer crossing the gate electrode is formed to pass through the gate electrode along a direction parallel to the signal line,
   the semiconductor layer of the first switching element has a U shape and the semiconductor layer of the second switching element has an L shape, the semiconductor layer of the first switching element is overlapped with the other sub-pixel adjacent to the first sub-pixel in a direction along the signal lines, and the semiconductor layer of the second switching element is not overlapped with the other sub-pixel adjacent to the second sub-pixel in a direction along the signal lines.

2. The display element according to claim 1, wherein a position in which the semiconductor layer of the second switching element and the signal line are connected to each other is different from a position in which the semiconductor layer of the first switching element and the signal line are connected to each other.

3. The display element according to claim 1, wherein the pixel includes a red sub-pixel, a green sub-pixel, a blue sub-pixel, and a white sub-pixel, and the first sub-pixel is the red sub-pixel and the green sub-pixel, and the second sub-pixel is the blue sub-pixel and the white sub-pixel.

4. The display element according to claim 3, wherein the pixel includes two each of the red sub-pixels and the green sub-pixels and one each of the blue sub-pixel and the white sub-pixel.

5. The display element according to claim 4, wherein a length in a direction along the signal line of the blue sub-pixel is longer than lengths in a direction along the signal lines of the sub-pixels of the other colors.

6. The display element according to claim 5, wherein a length in a direction along the signal line of the white sub-pixel is shorter than lengths in a direction along the signal lines of the sub-pixels of the other colors.

7. The display element according to claim 1, wherein the pixel includes a red sub-pixel, a green sub-pixel, a blue sub-pixel, and a white sub-pixel, and the second sub-pixel is the blue sub-pixel.

\* \* \* \* \*